United States Patent [19]
Yoshihara et al.

[11] Patent Number: 5,631,796
[45] Date of Patent: May 20, 1997

[54] ELECTRIC VEHICLE CONTROL SYSTEM

[75] Inventors: Shigeyuki Yoshihara, Katsuta; Sanshiro Obara, Tokai-mura; Nobunori Matsudaira, Hitachi; Shotaro Naito, Katsuta, all of Japan

[73] Assignees: Hitachi, Ltd.; Hitachi Automotive Engineering Co. Ltd., both of Japan

[21] Appl. No.: 552,438

[22] Filed: Nov. 3, 1995

Related U.S. Application Data

[63] Continuation of Ser. No. 123,480, Sep. 20, 1993, abandoned.

[30] Foreign Application Priority Data

Sep. 18, 1992 [JP] Japan .................. 4-249138

[51] Int. Cl.$^6$ ...................................... H02H 3/18
[52] U.S. Cl. .................. 361/79; 361/23; 361/30
[58] Field of Search .................. 361/23, 31, 78, 361/79, 86, 30; 318/139

[56] References Cited

U.S. PATENT DOCUMENTS 4,371,824  2/1983  Gritter ........................... 361/18
4,500,820  2/1985  Noto et al. ..................... 318/139

FOREIGN PATENT DOCUMENTS

56-58703  5/1981  Japan.
57-80202  5/1982  Japan.

*Primary Examiner*—Jeffrey A. Gaffin
*Assistant Examiner*—Sally C. Medley
*Attorney, Agent, or Firm*—Evenson, McKeown, Edwards & Lehanan P.L.L.C.

[57] ABSTRACT

An electric vehicle control system which maintains good driving performance under normal conditions, and can cut off driving current upon malfunction of a microcomputer before restarting. A setting circuit of a comparing and operating circuit has a set signal fixed to V2 if an accelerator pedal is released. If a microcomputer malfunctions to drive an inverter absent a depression of the accelerator pedal, a current flows from a battery and a battery current sensor generates an output signal n. If this value exceeds V2, a comparator is turned on, which also turns on a transistor to energize a relay and disconnects an inverter drive signal s to break the power supply from an inverter to the ac motor. Upon disconnection, an alarm lamp is lit to issue an alarm to the driver. The disconnection is held by a delay circuit until the power is reset.

25 Claims, 7 Drawing Sheets

ELECTRIC VEHICLE CONTROL SYSTEM

This application is a continuation of application Ser. No. 08/123,480 filed on Sep. 20, 1993 now abandoned.

BACKGROUND OF THE INVENTION

The present invention relates to an electric vehicle control system. More particularly, it concerns an electric vehicle control system which assures safe operability of the vehicle in the case of malfunction of a microcomputer which is part of the control system.

In prior art control systems for electric vehicles, a microcomputer generally receives an accelerator signal, a key switch signal, a current detection signal, and a motor rotational signal, processes this information, and controls an electric motor. Since such systems depend on the proper functioning of the microcomputer to operate the vehicle motor, a malfunction of the microcomputer can cause a loss of control. It is obviously undesirable from a safety standpoint for the driver to be unable to control the vehicle in the event of such a microcomputer malfunction. Two prior art control systems address this problem:

1. An electric vehicle control system disclosed in Japanese Patent Laid-Open No. 58703 of 1981 provides for a logical AND operation of an acceleration switching signal from a microcomputer and an accelerator switching signal, to switch a chopper to an acceleration mode. Driving can be always switched to regeneration or coasting whenever the accelerator is released, thereby enhancing safety.

2. In the electric vehicle control system disclosed in Japanese Patent Laid-Open No. 80202 of 1982, a microcomputer is reset once if a current flowing into a dc motor is higher than a voltage is signal corresponding to the position of an accelerator pedal. After a predetermined time, operation of the motor is restarted.

However, these prior art devices involve the following problems:

Prior art 1 provides inferior driving performance because the acceleration and regeneration of the main circuit are turned off whenever the accelerator is released in ordinary driving.

Prior art 2, on the other hand, resets the microcomputer, but does not interrupt the current itself in the event of a malfunction of the microcomputer; thus, the vehicle continues running while the microcomputer is reset. Also, it may occur that the microcomputer must be reset repeatedly if it is not recovered from the malfunction, which is also a safety hazard.

In view of the foregoing, it is an object of the present invention to provide an electric vehicle control system which offers good driving performance in ordinary driving, and can securely cut off current upon malfunction of a microcomputer before restarting.

SUMMARY OF THE INVENTION

In the electric vehicle control system according to the invention, a sensor for detecting an accelerator pedal position provides an output signal to a power control unit for controlling power supply to an electric motor, and a power detection unit detects the power supply to the motor. A judgment unit compares the output signal from the accelerator pedal position sensor with the output of the power detection unit to detect power control unit malfunctions, and controls the operation of an on/off switch to disconnect the power supply from the motor in the case of a malfunction. A holding means for holding the disconnection state of the power supply, and starting means for restarting are also provided.

Preferably, the electric vehicle control system also has a display to inform the driver of the disconnection of the motor.

The power detection unit may detect the current flowing either from a battery or into the motor; and the on/off switch may disconnect a control signal from the power control unit, or may directly interrupt the supply of power from the power control unit to the motor.

Preferably, the judgment unit operates independently from the power control means and detects a malfunction if (among other circumstances) the power supply to the motor exceeds a predetermined value when the accelerator pedal is released. For this purpose, a release of the accelerator pedal is detected if the position of the accelerator pedal is less than a predetermined value.

The accelerator pedal position sensor may, for example, comprise one or more switches for selectively detecting whether the accelerator pedal is depressed, and the judgment unit detects a release of the accelerator pedal if the switches are set to a predetermined state.

Preferably, the motor is an alternating current motor, with power being provided by an inverter circuit. A resistor can be provided between the on/off switching means and the inverter circuit.

The electric vehicle control system of the present invention operates as follows. If the judgment unit detects a power control unit malfunction, the on/off switch interrupts the supply of power to the motor. At all other times, the power control unit keeps the connection, thus enabling the vehicle to continue normal driving performance. A holding unit continues the disconnection of the power supply until the vehicle operator turns the main power switch off and back on, so that the microcomputer is reset in a conventional manner.

The display informs the driver of a power control unit malfunction. Further, an output value of the accelerator pedal position sensor is compared with an output value of the power detection means. This allows the driver to check for a malfunction of the power control unit simply by observing whether the motor is driven without pressing the accelerator pedal.

Additional features of the control system according to the invention are as follows: The power detection unit detects the current flowing from the battery, so that it can accurately detect the supplied current even if the current is regenerated by the motor. The battery current sensor detects the motor current for the power detection unit, allowing use of the existing sensor which is normally provided for operation of the vehicle. In addition, the control signal according to the invention is generated separately from the power control unit, and thus provides an arrangement for disconnecting the power from the motor by means of a simple additional device which controls an ON/OFF switch for the power supply. Alternatively, the power supply can be disconnected directly by providing a power breaker between the power unit and the motor. The judgment unit can operate independent from the power control unit so that the power supply disconnection can be made reliably without being affected by a malfunction of the power control unit.

In the control system according to the invention, if the motor power supply exceeds a predetermined value when the accelerator pedal is released, a microcomputer malfunction is assumed. For this purpose, according to a first embodiment of the invention, it is concluded that the accelerator pedal has been released if the accelerator pedal position detected by the sensor is less than a predetermined value. Alternatively, if a plurality of pedal position sensors or switches is used (as described below), a release will be detected if the outputs of all of the pedal position sensors or switches are lower than a predetermined threshold value. In still another embodiment, a switch capable of selectively detecting whether the accelerator pedal is pressed or not is provided; or a multiple switch arrangement may be used, with a release being detected when all of the switches are set to a predetermined state. Finally, a release may be detected by use of both the pedal position and the switch state.

According to another feature of the invention, it is desirable to vary the level of the voltage V1 used to detect a microcomputer malfunction, so that V1 increases with increasing depression of the accelerator pedal position Xa. That is, when the vehicle is being operated at higher speeds, and Xa is large, the voltage V1 (above which a microcomputer malfunction is determined to exist) is larger and the system is less sensitive. When the accelerator pedal is depressed only slightly, on the other hand, and the power provided to the motor is small, the level of V1 is decreased. This is achieved by providing a plurality of accelerator pedal position switches which have differing sensitivities, so that they are active at different pedal positions Xa. Based on the outputs of such switches, the pedal position Xa can be divided into zones, with each zone having a different voltage V1 associated with it.

Other objects, advantages and novel features of the present invention will become apparent from the following detailed description of the invention when considered in conjunction with the accompanying drawings.

DETAILED DESCRIPTION OF THE DRAWINGS

Figure 1:
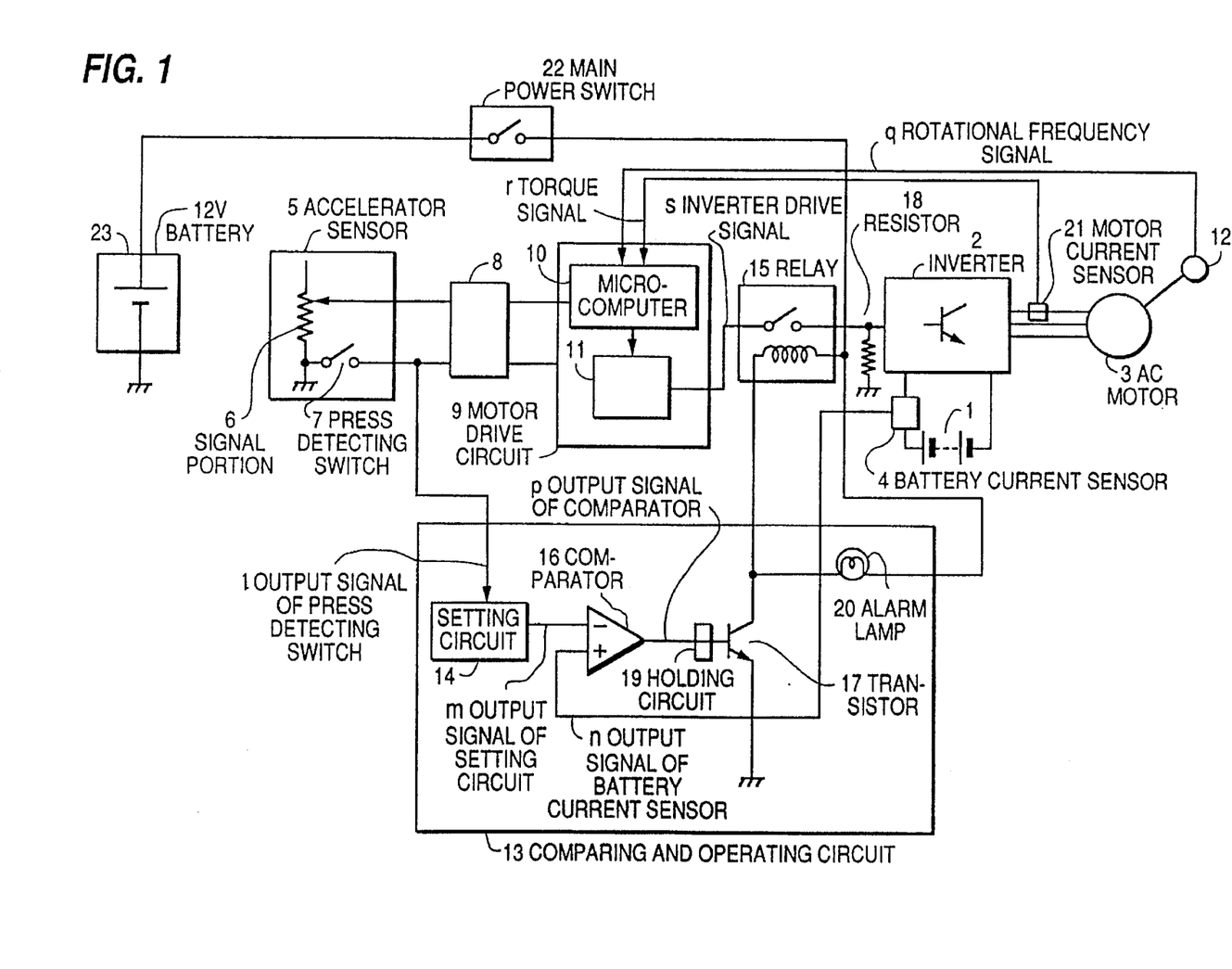
FIG. 1 is an overall block diagram of an embodiment of the electric vehicle control system according to the present invention.

FIG. 1 is an overall block diagram of an electric vehicle control system according to the present invention. It includes an accelerator sensor 5 having a signal generating portion 6 for generating a voltage signal depending on the position of the accelerator pedal, and an accelerator pedal depression detecting switch 7 for detecting a depression of the accelerator pedal. A motor drive circuit 9, having a microcomputer 10 and a drive signal generator circuit 11 for driving an inverter, is coupled to the accelerator sensor 5 by an interface circuit 8. An inverter 2 for converting dc power of a battery 1 to ac power to drive an ac motor 3, is coupled to the drive signal generator circuit 11 of the motor drive circuit 9 by a normally closed relay 15.

A motor current sensor 21 is provided between the inverter 2 and the ac motor 3, which has a rotational speed sensor 12 attached thereto. A torque signal r from the motor current sensor 21 and a rotational speed signal q from the sensor 12 are entered into the microcomputer 10. A battery current sensor 4 detects current flowing from the battery 1 to the inverter 2 and provides an output signal n to the comparing and operating circuit 13, where it is compared with the accelerator pedal position signal 1 from acceleration pedal position sensor 5. The comparing and operating circuit 13 also has an alarm lamp 20.

Figure 2:
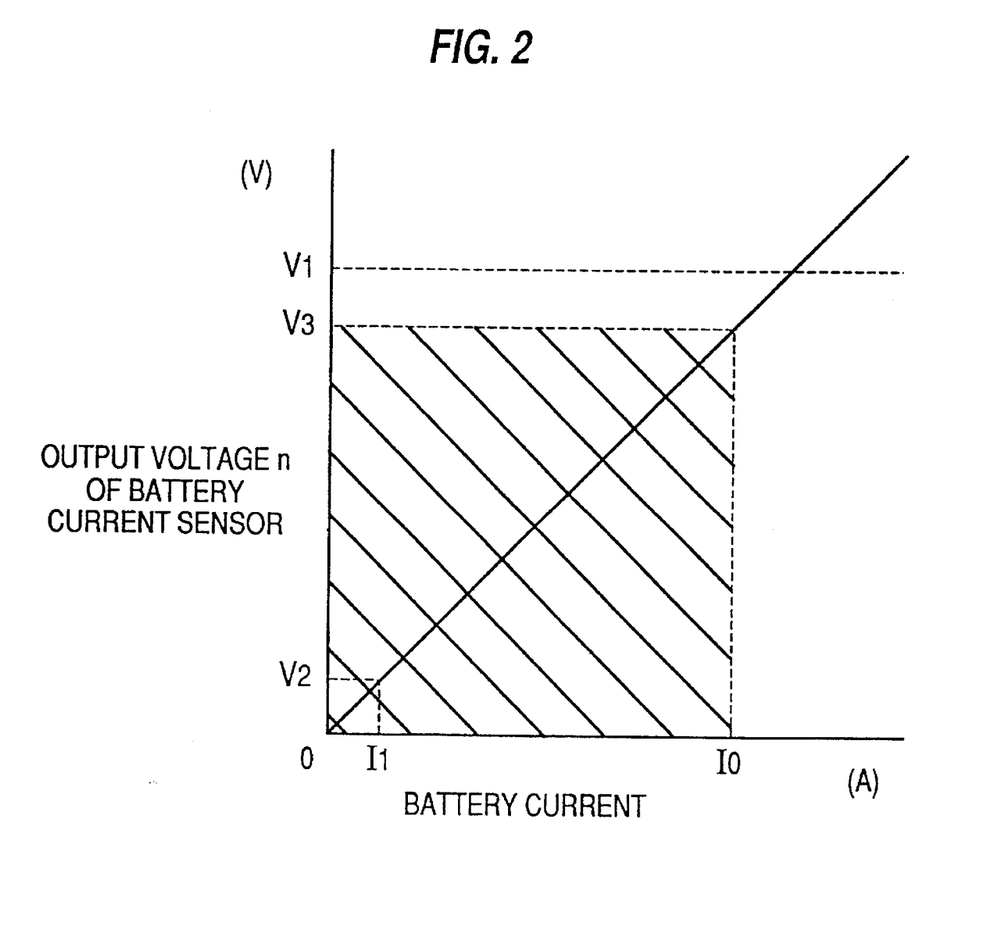
FIG. 2 is an output characteristic of a battery current sensor.

As shown in FIG. 2, the output signal of the battery current sensor 4, increases linearly with the battery current. The cross hatched area of the figure represents a normal driving range, in which the battery current is less than a current $I_0$ (predetermined based on an output limit of the ac motor 3 and a restriction of the inverter 2), and the output signal n of the battery current sensor 4 is less than V3. As explained in greater detail later, the output signal n therefore normally is also lower than a value V1 of an output signal m of a setting circuit 14 when the accelerator pedal is depressed. Moreover, if the battery current is 0, the output signal n of the battery current sensor 4 is also 0, and is thus lower than a value V2 of the output signal m from the setting circuit 14 when the accelerator pedal is released. The operating significance of the output voltages V1 and V2 will be described in more detail later.

In an alternative embodiment, instead of detecting the battery current with the battery current sensor 4 as described above, the motor current sensor 21 provided between the inverter 2 and the ac motor 3 can be used to detect motor current directly.

Figure 3:
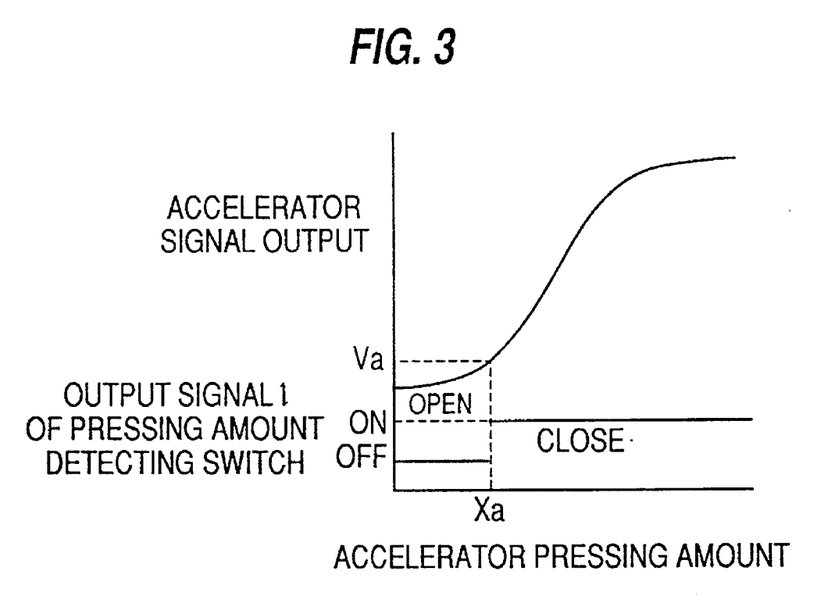
FIG. 3 shows an accelerator pedal position signal from an accelerator sensor and the output signal of a depression detecting switch.

FIG. 3 is a characteristic curve which shows the output signal from accelerator pedal position sensor 5 as a function of the accelerator pedal position x, and also shows the output signal 1 of the depression detecting switch 7. The accelerator pedal position signal, as shown in the figure, increases with increasing depression of the accelerator pedal. However, the detecting switch 7 remains open, or OFF, until the accelerator pedal reaches position Xa, at which point it closes, or is turned ON. The accelerator pedal signal output corresponding to the accelerator pedal position Xa, then, is Va.

Figure 8:
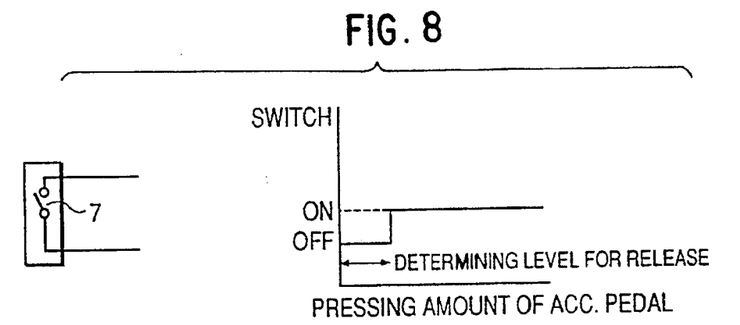
FIGS. 8–12 show alternative arrangements for determining whether the accelerator pedal is depressed or has been released.
Figure 9:
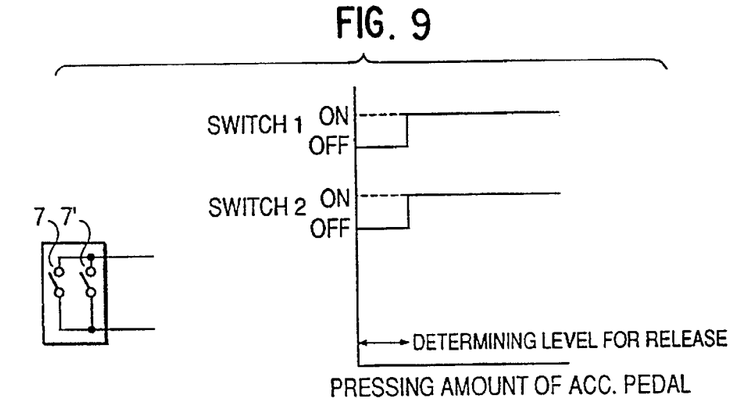
Figure 10:
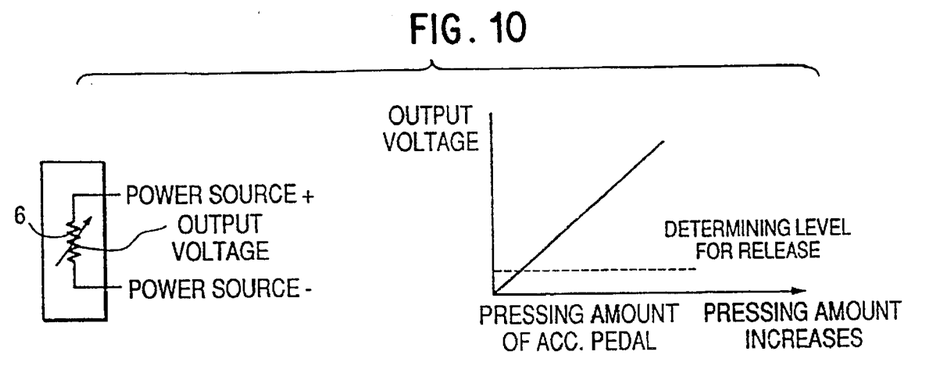
Figure 11:
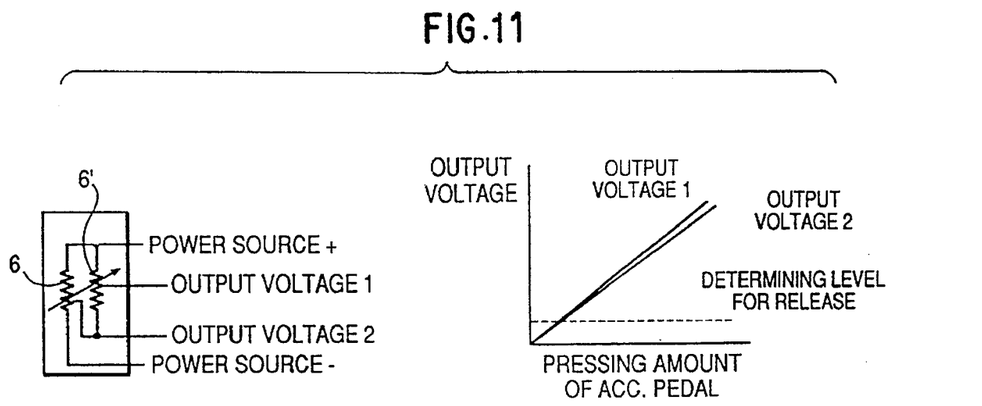
Figure 12:
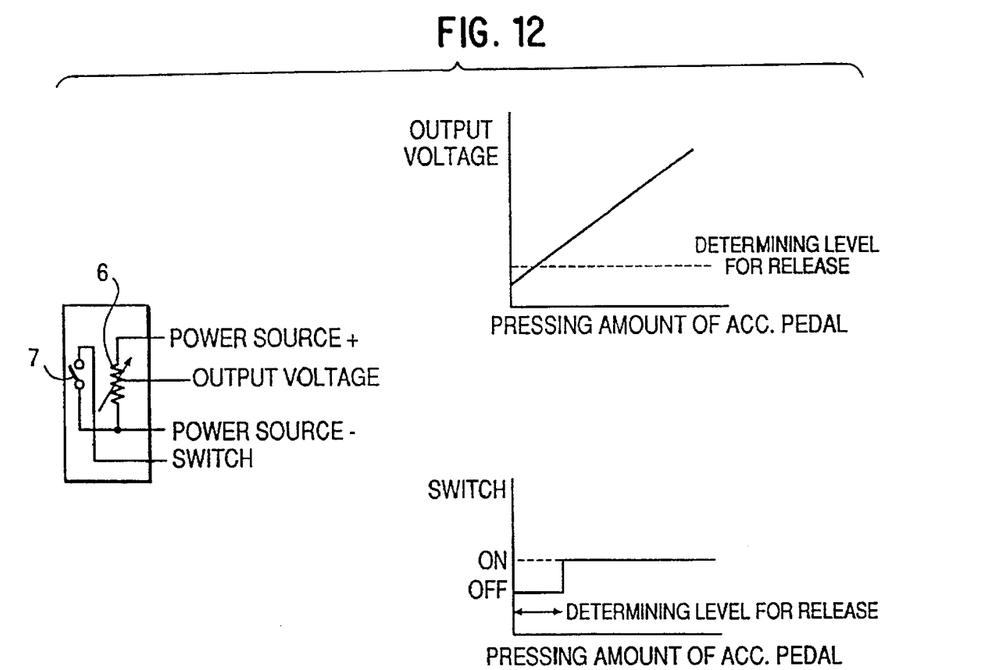

FIGS. 8 through 12 show alternative arrangements for determining whether the accelerator pedal is depressed or has been released. In FIG. 8 (which corresponds to the arrangement of FIG. 1) a single switch 7 is provided, and the accelerator pedal is deemed depressed when the switch 7 is closed, while in FIG. 9, a plurality of switches 7, 7' are provided, and release of the accelerator pedal is determined when all of the switches are in an open position, thus providing a greater margin of safety against false release determinations. In FIG. 10, depression of the accelerator pedal is detected based directly on the output of the accelerator position sensor, which corresponds to element 6 in FIG. 1. In this embodiment, it is determined that the accelerator pedal is depressed when the output voltage exceeds a predetermined threshold value, and that it has been released when the voltage is less than the threshold. In FIG. 11, a plurality of position sensors 6, 6' are provided, and a release of the accelerator pedal is determined only when the outputs of all of the sensors are below the fixed threshold. Finally, in FIG. 12, depression and release of the accelerator pedal are determined based on the outputs of both a switch 7 and a position sensor 6, with a release being determined only when the output of the sensor 6 is less than a predetermined threshold and the switch 7 is open.

Referring again to FIG. 1, in comparing and operating circuit 13, a comparator 16 receives the output signal m from the setting circuit 14, the level of which changes with the output signal 1 of the accelerator pedal depression detecting switch 7, and the output signal n of the battery current sensor. An output signal p of the comparator 16 is connected with the base of a transistor 17 through a delay circuit 19 for holding the output. (Delay circuit 19 may, for example, be a conventional latch circuit, which is reset when the vehicle ignition switch is turned from off to on.) The collector of the transistor 17 is connected with a contact opening coil of the relay 15 and with the alarm lamp 20 which is turned on when the transistor 17 is on.

Figure 4:
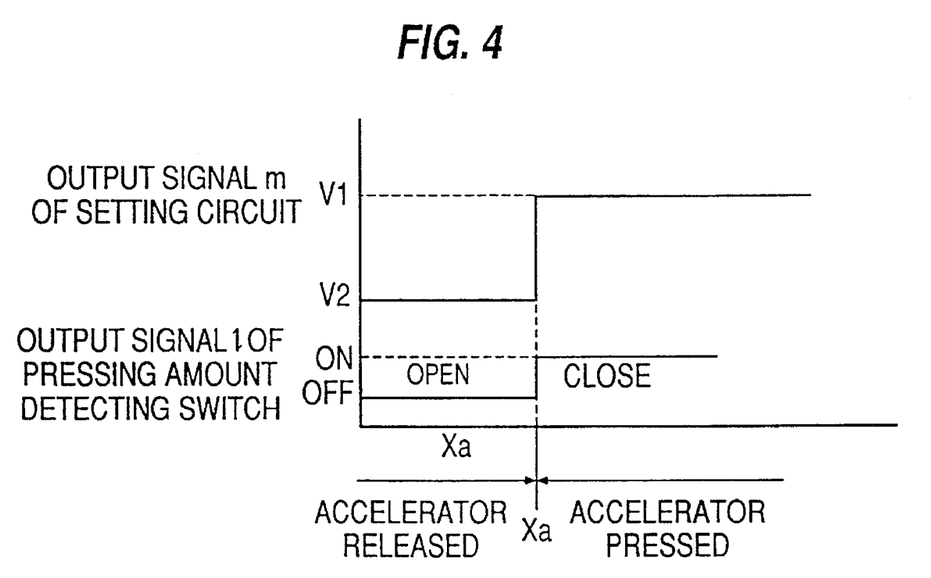
FIG. 4 depicts an output signal of the accelerator depression detecting switch, together with the output signal of a setting circuit.

FIG. 4 shows output signal 1 of the depression detecting switch 7 and the output signal m of the setting circuit 14 as a function of accelerator pedal position x. The output signal m of the setting circuit 14 changes from V2 to V1 when the output signal 1 of the depression detecting switch 7 changes from off to on at the pressing amount Xa.

In normal driving, the microcomputer 10 of the motor drive circuit 9 detects the accelerator pedal position from the accelerator sensor 5. It also receives a torque signal r and a rotational frequency signal q fed back from the motor current sensor 21 and the motor rotational frequency sensor 12 respectively. On the basis of these input signals, the microcomputer 10 sends a torque command and a motor rotational frequency command to the drive signal generator circuit 11, which drives the inverter 2 in a manner that is well known to the art.

Figure 5:
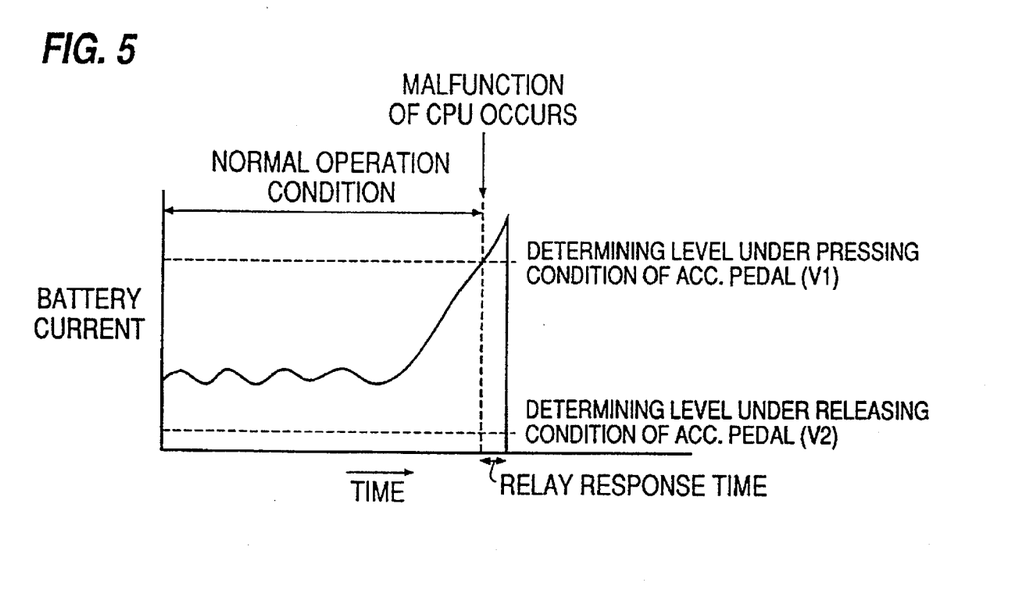
FIG. 5 is a graphic depiction of battery current vs. time.

As long as the accelerator pedal is depressed, the switch 7 remains closed, and the output signal m of the setting circuit 14 is set to V1 (see FIG. 4). Because the output signal n of the battery current sensor 4 is lower than V3 (assuming that the vehicle is operated in the normal driving range), it is also less than V1 (see FIGS. 2 and 4), and the comparator 16 remains off. If, however, a malfunction occurs while the accelerator pedal is depressed, the output signal n may increase to a level which is greater than V1, as shown in FIG. 5. When this occurs, it is determined that the computer has malfunctioned, and the battery current is interrupted by the relay 15. (As shown in FIG. 5, the relay has a finite response time so that there is a brief delay between the time when the battery current first exceeds V1 and the cutoff of battery current.)

Figure 6:
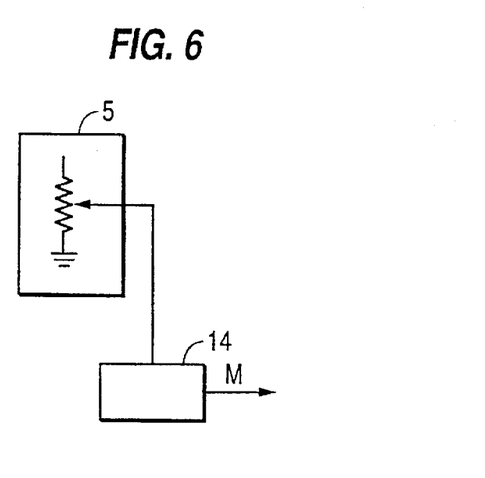
FIG. 6 shows an alternative arrangement of the accelerator sensor 5 and setting circuit 14.
Figure 7:
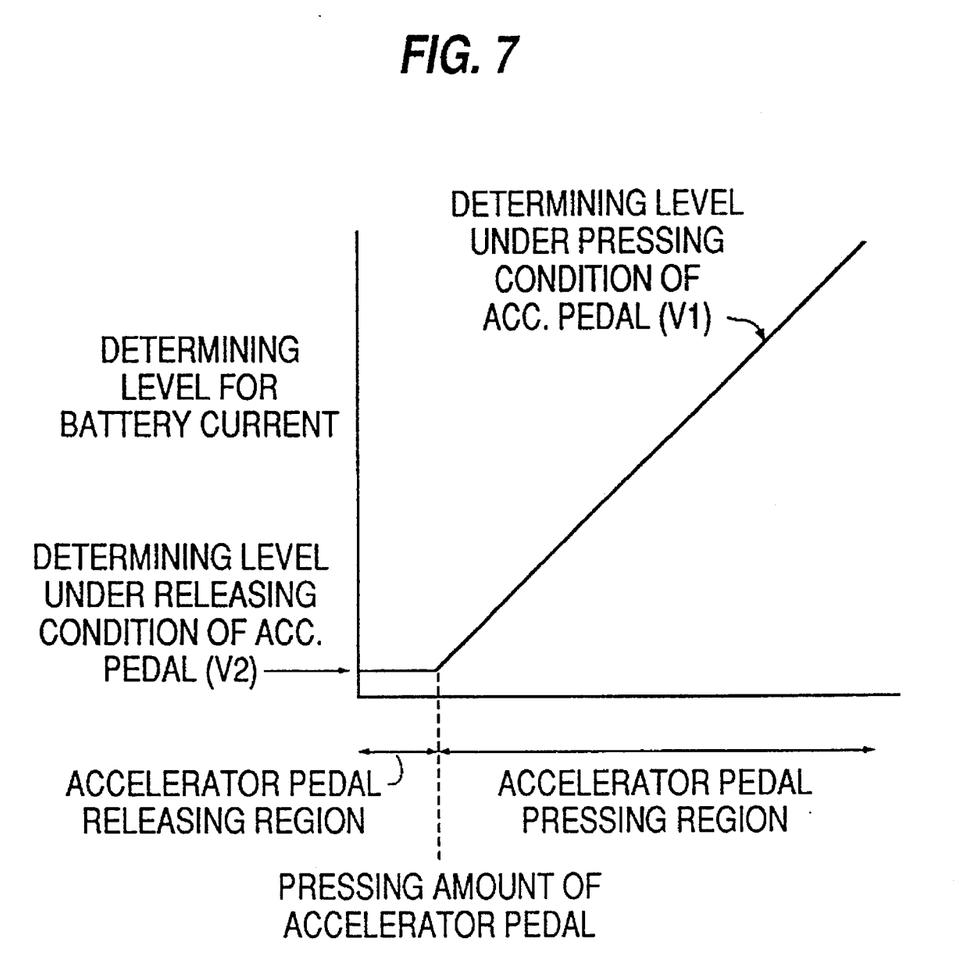
FIG. 7 is a graphic depiction which illustrates the operation of an embodiment of the invention in which V1 varies with the accelerator pedal position Xa.

FIG. 6 shows an alternative embodiment on the invention in which the magnitude of the voltage V1 is dependent upon the extent of depression of the accelerator pedal, Xa so that the sensitivity of the system to detect computer malfunctions while the vehicle is moving is increased. That is, when the value of V1 is fixed, it must be set at a level which reflects maximum depression of the accelerator pedal (so that if the output voltage of the battery current sensor exceeds V1, it is certain that a malfunction has occurred). However, in this case, if a malfunction occurs while the accelerator pedal is depressed only slightly, the battery current may not exceed the V1 level, and the circuit may therefore not be protected. Accordingly, it is desirable to vary the malfunction determining threshold V1 in proportion to the accelerator pedal position Xa. This can be done as shown in FIG. 6, by supplying the output signal from the accelerator position sensor 6 to a threshold value comparator 14, which compares it with a series of threshold values and outputs a discrete level M dependent on the magnitude of the input signal. Alternatively, V1 may be continuously variable, having a magnitude proportional to Xa, as shown in FIG. 7.

When the accelerator pedal is released, the switch 7 opens, and the output signal m of the setting circuit 14 changes to V2 (see FIG. 4). If the microcomputer 10 is functioning properly at this point, the motor drive circuit 9 also turns the inverter 2 off, and the battery current falls to 0. The output signal n of the battery current sensor 4 is thus lower than V2 (see FIG. 2), and once again the comparator 16 remains off as above.

However, the microcomputer 10 may malfunction, for example causing drive signals such as a rotation frequency command to be sent to the drive signal generator circuit 11 to drive the inverter 2, even though the accelerator pedal is released. Such a situation is clearly undesirable, because the motor's operation against the driver's will may result in runaway of the electric vehicle. To prevent such an event, the present embodiment is constructed to cut the motor current off until a restart of the electric vehicle.

The following describes operation of the electric vehicle control system.

If the accelerator pedal is released, the output signal m of the setting circuit 14 goes to V2 (see FIG. 4). If the operation of the microcomputer 10 is incorrect, and the inverter 2 remains excited, the battery current which drives the ac motor 3 continues to flow. If the output signal n from current sensor 4 is greater than V2, the comparator 16 is turned on, thus turning on the transistor 17 and energizing the relay 15, which disconnects the inverter drive signal s (generated by the drive signal generator circuit 11 of the motor drive circuit 9) from the inverter 2. Power supply from the inverter 2 to the ac motor 3 is therefore cut off, which prevents runaway operation of the vehicle. The activation of the comparator 16 is held by the delay circuit 19 to continue the cutoff until the ignition key is turned off and back on again by the vehicle operator, so that the microcomputer is reset and the system is restarted to turn on the power. At the same time as the turn-on of the transistor 17, the alarm lamp 20 is lit to issue an alarm to the driver. Seeing the alarm indication, the driver can reset the system by turning a main power switch off and the back on again.

In the embodiment described above, the output signal m of the setting circuit 14 is dependent upon the output signal 1 of the accelerator depression detecting switch 7. Alternatively, the output signal m can instead be directly linked to the accelerator pedal signal output shown in FIG. 3, so that the output signal m can be changed from V1 to V2 if the accelerator signal output becomes lower than the output Va corresponding to the accelerator pedal position Xa. As another alternative, a logic circuit can be provided to combine the accelerator pedal output signal and output signal from switch 7 in a logical AND function, so that when the accelerator signal output is lower than Va and the output signal 1 of switch 7 turns from on to off, the output signal m of the setting circuit 14 changes from V1 to V2.

As another alternative embodiment, a plurality of accelerator sensors and a set of combined AND gate logic circuits can be provided, to change the output signal m of the setting circuit 14 from V1 to V2 if signal outputs from all of the sensors are lower than Va and the output signals 1 of the depression detection switches all turn from on to off.

In the embodiment described above, the inverter 2 is made of high capacity semiconductors, such as an insulated gate bipolar transistor ("IGBT"). If the relay 15 or the like disconnects the inverter drive signal s, a gate of the IGBT is opened. The IGBT itself may malfunction, however, so that the electric vehicle cannot be stopped or similar uncontrollable operations may result, which is of course highly undesirable from a safety standpoint. It is thus desirable to insert a resistor 18 between the relay 15 and the inverter 2 to stabilize the input to the inverter 2 when the relay 5 is open.

Instead of interrupting the drive signal from the motor drive circuit 9 by means of the relay 15 if the microcomputer 10 malfunctions, as another alternative a power breaker can be provided between the inverter 2 and the ac motor 3, to cut the power supply off directly.

In the embodiment described herein, the electric vehicle control system can maintain ordinary normal driving so long as the microcomputer 10 does not malfunction. This is accomplished by causing the comparing and operating circuit 13 to open the relay 15 only if the microcomputer 10 malfunctions. Also, the holding circuit 19 can securely maintain the open state so that the driver can again turn the power on to restart the motor.

The invention also provides a feature that the alarm lamp 20 warns the driver of a malfunction of the microcomputer 10. The driver can then check for a malfunction in which the ac motor 3 is driven without pressing the accelerator, as the accelerator pedal position is compared with the supplied power. Furthermore, the supplied current can be detected accurately even if it is regenerated by the ac motor 3, because a battery current sensor 4 is used. The inverter drive signal s can be disconnected only by the simple battery current sensor 4, and comparing and operating circuit 13 can be operated independently for reliable power disconnection because it is not affected by a malfunction of the microcomputer 10. The resistor 18 can prevent the inverter 2 itself from malfunctioning upon disconnection of the inverter drive signal s.

The electric vehicle control system of the embodiment described so far uses an ac motor. It is of course also possible to use the electric vehicle control system according to the invention to control a dc motor.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An apparatus for operating an AC electric motor system having an AC motor, an acceleration pedal, an inverter coupled to provide AC power to said AC motor, a battery coupled to provide a DC electric current to said inverter, and a control unit for controlling said inverter in response to said motor speed command input, said apparatus comprising:

a device comprising first means and second means, said first means generating a first signal having a predetermined constant value when the acceleration pedal is not depressed and a different, higher value when the acceleration pedal is depressed, and said second means generating said motor speed command input according to an acceleration pedal position when said acceleration pedal is depressed;

a sensor for detecting said DC electric current supplied from said battery to said inverter, and for generating a DC electric current signal having a value indicative of magnitude of the DC electric current;

a comparator arrangement for comparing values of said electric current signal and said first signal, and for generating an output signal in response to a determination that said electric current signal is greater than said first signal; and a switch apparatus for curtailing supply of electric power from said inverter to said AC motor in response to said output signal.

2. An apparatus according to claim 1, wherein said switch apparatus comprises a switch element connected between said control unit and said inverter.

3. An apparatus according to claim 1, wherein said switch apparatus comprises a switch element coupled to interrupt a flow of electric current from said inverter to said motor.

4. An apparatus according to claim 1, wherein said device for generating a first signal comprises:

a position sensor which detects position of said accelerator pedal, and outputs a position signal indicative thereof; and a first signal generator which provides a first signal having a value which is dependent upon a magnitude of said position signal.

5. An apparatus according to claim 4, wherein said position sensor comprises at least one switch element which is open when position of said accelerator pedal is less than a predetermined threshold value and which is closed when said position of said accelerator pedal is greater than said threshold value.

6. An apparatus according to claim 5, wherein said at least one switch element comprises a plurality of switch elements.

7. An apparatus according to claim 6, wherein said switch elements are connected in parallel.

8. Apparatus according to claim 4, wherein said position sensor comprises at least one variable resistor having a resistance which varies with position of said accelerator pedal, an output from said variable resistor being input to said first signal generator.

9. An apparatus according to claim 8, wherein said at least one variable resistor comprises a plurality of variable resistors.

10. An apparatus according to claim 4, wherein said position sensor comprises:

at least one variable resistance element having a resistance which varies with position of said accelerator pedal; and at least one switch element which is open when position of said accelerator pedal is less than a predetermined threshold value and which is closed when said position of said accelerator pedal is greater than said threshold value.

11. An apparatus according to claim 4, wherein said first signal generator comprises means for generating a first signal having a level V1 when said position signal is greater than at least a threshold value, and having a level V2 when said position signal is less than said at least a threshold value.

12. An apparatus according to claim 11, wherein said level V1 of said first signal is greater than said electric current signal when said control unit is operating without malfunction.

13. An apparatus according to claim 11, wherein said threshold value and said level V1 are variable and increased with increasing magnitude of said position signal.

14. An apparatus according to claim 11, wherein said means for generating said first signal comprises means for comparing said position signal with a plurality of threshold values, said level of said first signal having a magnitude which is indicative of a highest threshold value which is smaller than said position signal.

15. An apparatus according to claim 11, wherein said position sensor comprises a series of bistable switch elements, each of said switch elements being driven to an on mode at a value of said motor speed command input which is greater than a value of said motor speed command input at which a next preceding switch element is driven to an on mode, and each of which switch elements outputs a signal in said on mode which has a magnitude greater than said next preceding switch element; and wherein said first signal generator provides a first signal having a magnitude equal to magnitude of the greatest signal output by said bistable switch elements.

16. An apparatus according to claim 4, wherein said first signal generator comprises means for comparing said position signal with a plurality of threshold values, for determining a highest threshold value which is smaller than said position signal and for outputting a first signal having a magnitude which is indicative of said highest threshold.

17. An apparatus according to claim 16, wherein said comparator arrangement comprises a differential amplifier coupled to receive said first signal from said first signal generator and said electric current signal from said sensor for detecting said electric current supplied to said inverter.

18. An apparatus according to claim 17, wherein an output of said differential amplifier is coupled to a control input of said switch apparatus, whereby said switch apparatus interrupts said supply of power to said motor when said electric current signal is greater than said first signal.

19. An apparatus according to claim 17, further comprising a delay circuit which maintains said interruption of said supply of power until a main power switch of said motor is turned off and back on again.

20. An apparatus according to claim 4, wherein said position sensor comprises a series of bistable switch elements, each of said switch elements being driven to an on mode at a value of said motor speed command input which is greater than a value of said motor speed command input at which a next preceding switch element is driven to an on mode, and each of which switch elements outputs a signal in said on mode which has a magnitude greater than said next preceding switch element; and wherein said first signal generator provides a first signal having a magnitude equal to magnitude of the greatest signal output by said bistable switch elements.

21. An apparatus according to claim 1, further comprising a bistable element responsive to an output from said switch apparatus, for continuing curtailing of said power supply until a main power switch for said motor has been turned off and turned back on again.

22. An apparatus according to claim 1, further comprising means for generating an alarm signal in response to said output signal.

23. Method of operating an AC electric motor system having an AC motor, a motor speed command input device for generating a motor speed command input according to a position of an accelerator pedal, an inverter coupled to provide AC power to said AC motor, a battery coupled to provide a DC electric current to said inverter, and a control unit for controlling said inverter in response to said motor speed command input, said method comprising the steps of:

detecting when said accelerator pedal is depressed, and when said accelerator pedal is not depressed;

generating a first signal having a predetermined constant value when the accelerator pedal is not depressed, and a different higher value when the accelerator pedal is depressed;

detecting said DC electric current supplied from said battery to said inverter, and generating a DC electric current signal indicative of magnitude of the electric current;

comparing values of said first signal and said DC electric current signal, and generating an output signal when a value of said electric current signal exceeds a value of said first signal; and curtailing power supply from said inverter to said AC motor in response to generation of said output signal.

24. Method according to claim 23, wherein said curtailing step comprises interrupting an inverter drive signal from said control unit to said inverter.

25. Method according to claim 23, wherein said curtailing step comprises interrupting a flow of current from said inverter to said motor.

* * * * *